US008590694B2

(12) United States Patent
Smith

(10) Patent No.: US 8,590,694 B2
(45) Date of Patent: Nov. 26, 2013

(54) TRANSPORT APPARATUS

(75) Inventor: Damon Smith, Loughton (GB)

(73) Assignee: Neopost Technologies, Bagneux (FR)

( * ) Notice: Subject to any disclaimer, the term of this patent is extended or adjusted under 35 U.S.C. 154(b) by 45 days.

(21) Appl. No.: 12/795,927

(22) Filed: Jun. 8, 2010

(65) Prior Publication Data

US 2010/0314222 A1 Dec. 16, 2010

(30) Foreign Application Priority Data

Jun. 12, 2009 (GB) .................................. 0910140.3

(51) Int. Cl.
*B65G 17/12* (2006.01)
*B65G 17/30* (2006.01)

(52) U.S. Cl.
USPC ........................................ 198/728; 198/803.3

(58) Field of Classification Search
None
See application file for complete search history.

(56) References Cited

U.S. PATENT DOCUMENTS 3,972,413 A * 8/1976 Simeth ........................ 198/803.3
4,029,194 A 6/1977 Feurstein et al.
4,169,341 A 10/1979 Roetter et al.
4,402,393 A 9/1983 Kent
5,240,241 A * 8/1993 Kawazoe ...................... 271/114
5,303,809 A * 4/1994 Zeller ...................... 198/341.02
6,283,276 B1 9/2001 McCay
2004/0178561 A1 9/2004 Graef et al.

FOREIGN PATENT DOCUMENTS

EP 1 295 816 A2 3/2003
EP 2014590 A2 1/2009
GB 691027 5/1953
GB 1 021 315 A 3/1966
GB 1 544 572 A 4/1979
WO 9817554 4/1998
WO 0226508 A1 4/2002

OTHER PUBLICATIONS

European Search Report Appln. No. 10165767.4-1256/2261153; Aug. 21, 2012.

* cited by examiner

*Primary Examiner* — Kavel Singh
(74) *Attorney, Agent, or Firm* — Sughrue Mion, PLLC

(57) ABSTRACT

Apparatus for transporting documents in a paper handling system, comprising: a drive train; a document transport element connected to the drive train for moving documents; and means adapted to apply a relatively high voltage element to generate a high torque when the transport element is not loaded and to reduce the voltage and thus the torque a predetermined time after the transport element engages a document to be moved.

3 Claims, 4 Drawing Sheets

TRANSPORT APPARATUS

The present invention relates to apparatus for transporting documents in a paper handling apparatus.

Documents such as sheets or stacks of paper are typically transported between separate modules of a paper handling apparatus, such as a mailing machine. For example they may be transported from storage hoppers to a collating station, where a pack of multiple sheets and other items may be assembled into a pack, and subsequently to an inserting station where the pack is pushed into an envelope. This transport is typically done by pushing using a pawl mounted on a drive train.

It is desirable that such apparatus be capable of handling a variety of sizes and weights of packs without damage occurring to the mechanisms even if a paper jam occurs. In a known such apparatus, marketed as under the trade mark Maxi-Mailer™ by PFE International Limited, this was achieved by allowing the pawl to be pushed backwards if a force above a predetermined one is applied to it and making the drive train flexible so that it is not damaged itself. However this arrangement can only cope with relatively low loads and there is a need for apparatus which will handle much heavier loads for which the pawl must be fixed and not be allowed to move from its upright position.

According to one aspect of the present invention there is provided apparatus for transporting documents in a paper handling system, the apparatus comprising: a flexible drive train; a document transport element connected to the drive train for moving documents; and means for constraining the flexible drive train to move along a predetermined serial path.

According to one embodiment the apparatus comprises at least one roller connected to the drive train and constrained for uni-dimensional movement in a guide channel.

Preferably the transport element is arranged to push documents, but anyone skilled in this technical field will understand that equivalent elements may be used to pull documents or to lift them. The element may be an upstanding pawl with a pawl support member extending rearwardly in the direction of travel of the drive train.

The drive train is preferably a chain with a plurality of chain links and the support member may have a base length extending over at least two chain links. The roller may be mounted adjacent and parallel to the drive chain. The pawl support member preferably overlies the drive chain at least in part, and it prevents the chain buckling upwardly. However, a fixedly mounted pusher/puller roller may be used.

The drive chain may be driven by an electromagnetic friction clutch which transmits a torque when a DC voltage is applied. Preferably the torque is proportioned to the voltage.

According to a second aspect of the invention there is provided apparatus for transporting documents in a paper handling system, comprising: a drive train; a document transport element connected to the drive train for moving documents; and means adapted to apply a predetermined torque when the transport element is not loaded and to apply a reduced torque a predetermined time after the transport element engages a document to be moved.

For a better understanding of the present invention and to show how the same may be carried into effect, reference will now be made to the accompanying drawings, in which.

Figure 1:
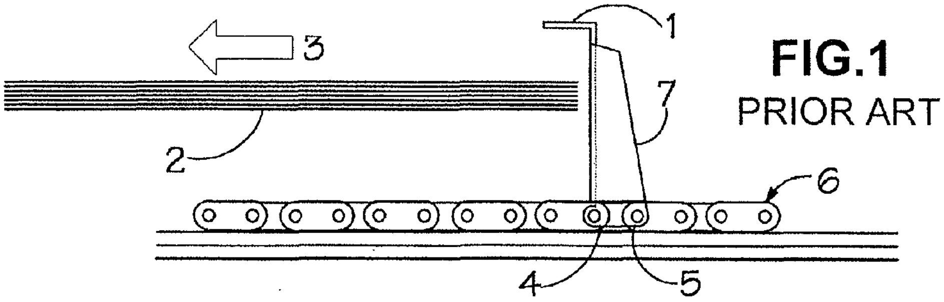
FIG.1 PRIOR ART
FIG. 1 is a schematic side view of a prior art apparatus.

In a conventional apparatus for transporting documents, as illustrated in FIG. 1, a pawl 1 pushes a document pack 2 in the direction of arrow 3. The pawl 1 is connected between two adjacent links 4 and 5 of a chain 6 which forms the drive train for the pawl 1. The pawl has a backwardly extending support portion 7 for extra stability and strength.

Figure 2:
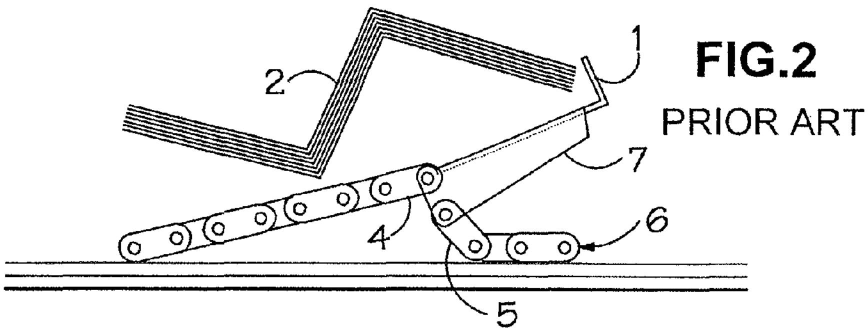
FIG.2 PRIOR ART
FIG. 2 is a schematic side view of the apparatus of FIG. 1 in the event of a paper jam.
Figure 3:
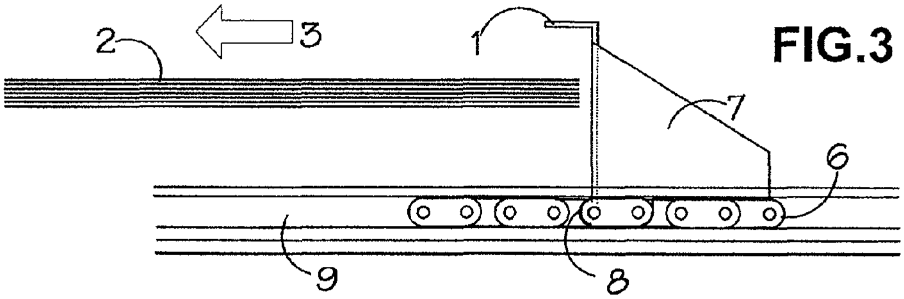
FIG. 3 is a schematic side view of part of the apparatus according to the invention.

FIG. 2 illustrates the situation if there is a paper jam in the apparatus such that resistance is encountered to movement of the document pack 2. As can be seen the drive train continues to try to move forward in the direction of arrow 3 causing the document pack 2 to buckle. The reaction force causes the pawl 1 to bend over backwards which releases the force on the main driving mechanism. The drive train 6 buckles as the pawl 1 is pushed backwards.

Figure 4:
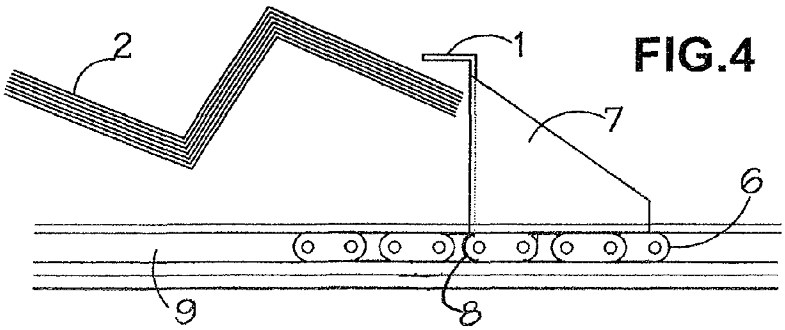
FIG. 4 is a schematic side view of the apparatus of FIG. 3 in the event of a paper jam.
Figure 5:
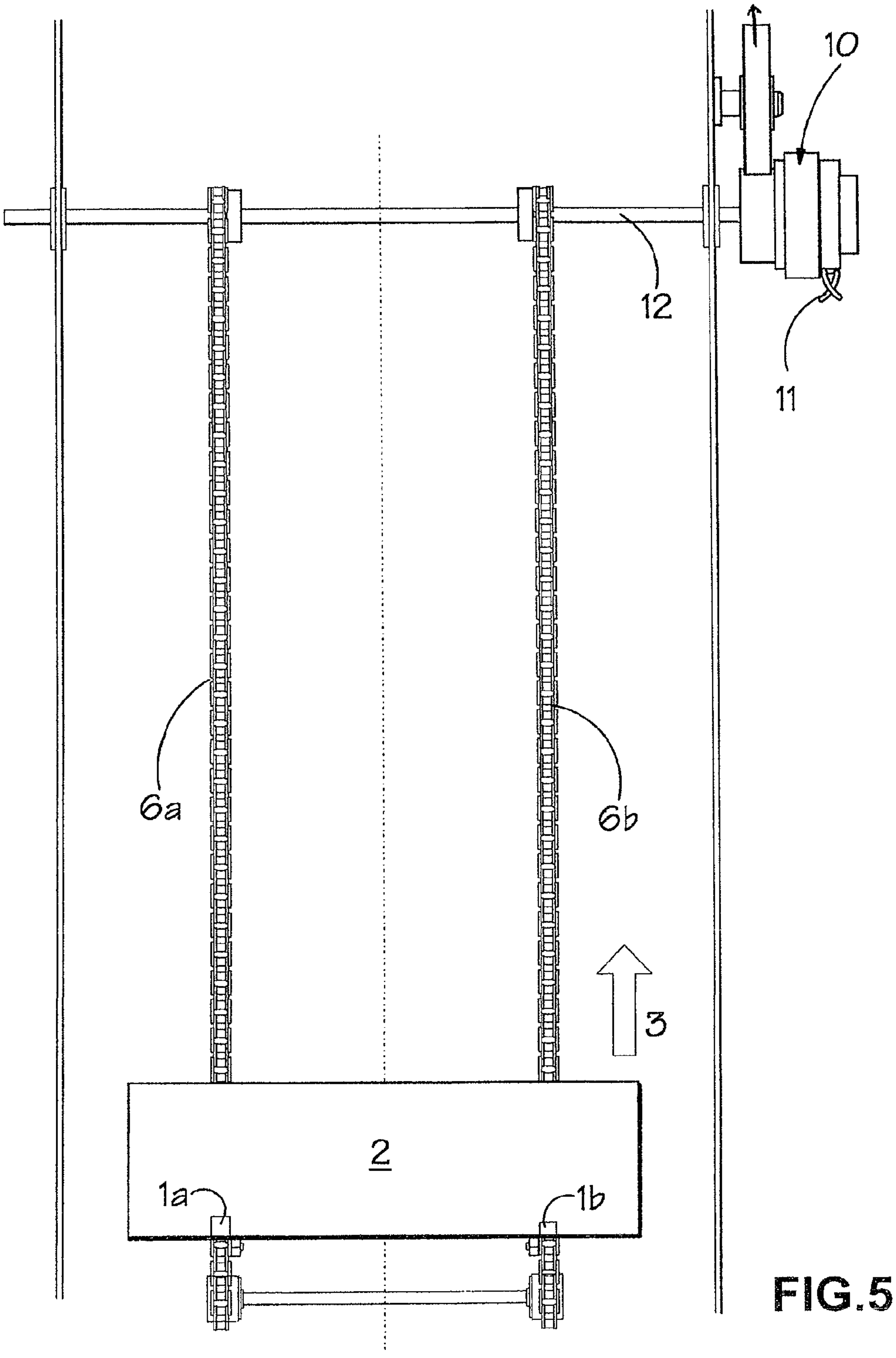
FIG. 5 is a top plan view of the apparatus according to the invention.
Figure 7:
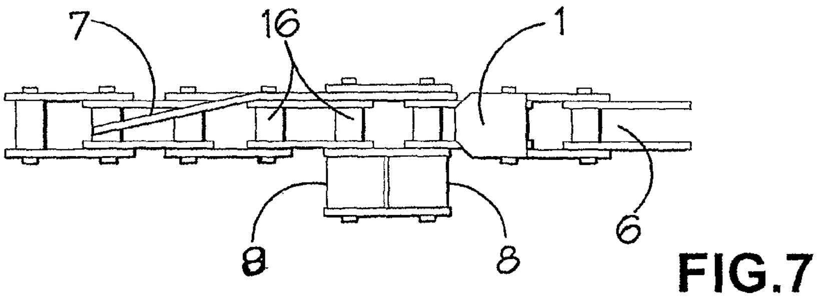
FIG. 7 is an enlarged top plan view of part of the apparatus of FIGS. 5 and 6.

In FIGS. 4 and 5 apparatus according to the invention is illustrated and again a pawl 1 drives a document pack 2 in the direction of arrow 3 via chain link drive 6. However, in contrast to the prior art example, the pawl 1 has a much longer backwardly extending portion 7 which extends over more than two chain links in this example, but could be more. As can be seen in FIG. 7, the background portion 7 rests over the top of the chain 6 and in this example is angled to cover the width of the chain.

This longer extension to the pawl 7 strengthens the pawl and allows it to push larger document stacks and more weight without itself being pushed over. It also will not easily be pushed over when there is a paper jam as shown in FIG. 4. This is because rollers 8 are attached to the chain link and are constrained in a guide channel 9 so that the chain cannot buckle. The rollers are illustrated more clearly in FIGS. 7 to 9 described later.

FIG. 5 shows document pack 2 being pushed in the direction of arrow 3 by two pawls 1*a* and 1*b* on parallel guide chains 6*a*, 6*b*. The chains 6*a*, 6*b* are driven by an electromagnetic friction clutch 10 which transmits a torque when a DC voltage is applied to it. The torque is related to the value of the DC voltage applied via wires 11. For inserting document packs in envelopes it is preferable to use a voltage such that the maximum possible torque is transmitted from the clutch.

Figure 6:
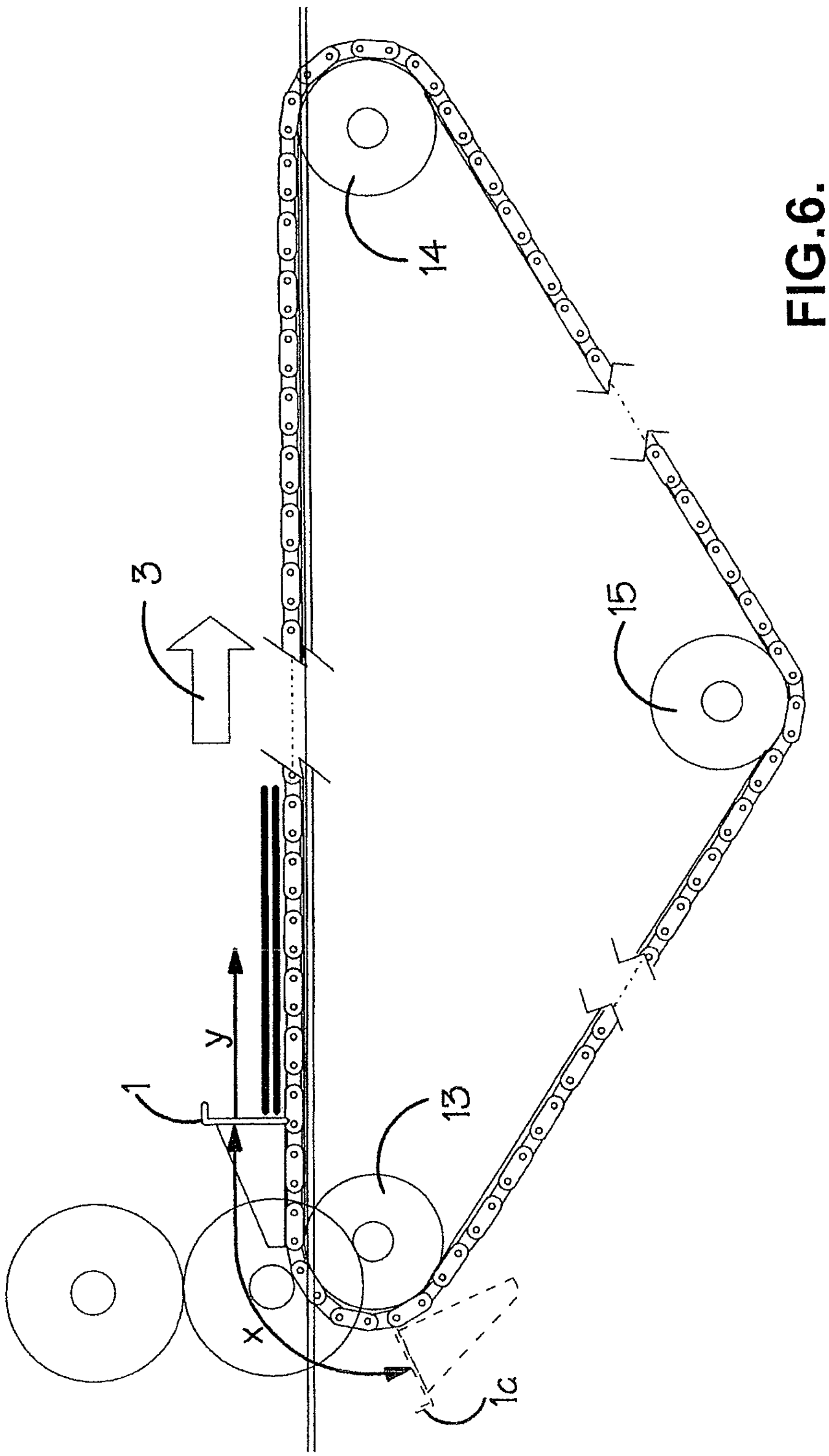
FIG. 6 is a side view of the apparatus of FIG. 5.

The friction clutch 10 drives rod 12 which is connected to the two chain link drive trains 6*a* and 6*b*, to drive them around pulley wheels as shown more clearly in FIG. 6.

The drive chains 6*a* and 6*b* are connected to three pulley wheels 13, 14 and 15. The pawl rest position is shown at 1*c* adjacent pulley wheel 13.

The insert pawl is driven from rest position 1*c* through a distance x to position 1 to pick up the document pack 2 which it has to move. The clutch torque is kept at its maximum through the distance x so that the system can overcome the sudden increase in inertia at the point where the pawls start to drive the mass of the document pack 2.

After distance x the DC voltage to the friction clutch 10 is reduced over the distance y. This lowers the torque that can be transmitted by the clutch but is sufficient to continue to drive the pack 2. If a paper jam occurs and the system becomes loaded beyond the torque provided by the clutch then the drive armature of the clutch slips. Hence the main drive mechanism is isolated and will not be damaged if a jam occurs.

Figure 8:
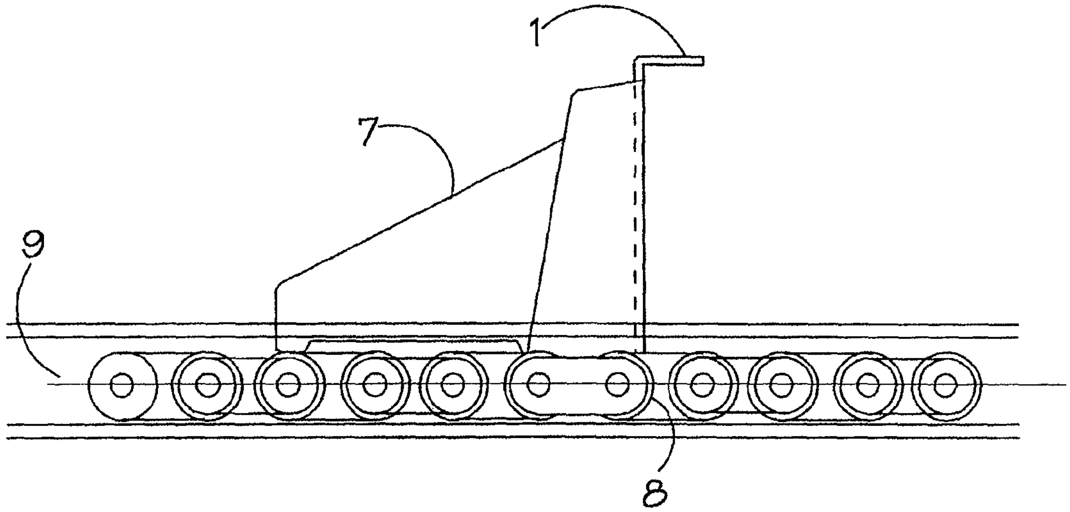
FIG. 8 is an enlarged side view of part of the apparatus of FIGS. 5 and 6.
Figure 9:
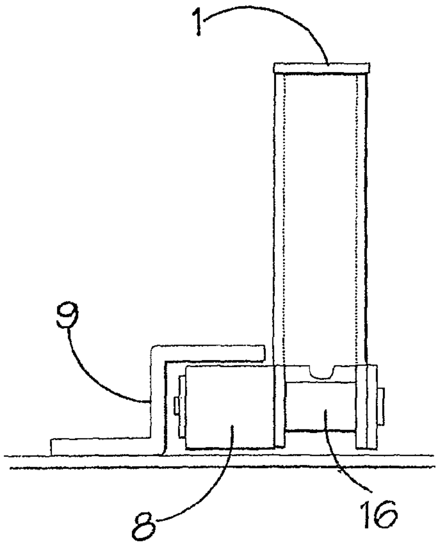
FIG. 9 is a cross sectional view of the part of FIGS. 7 and 8.

FIGS. 7 to 9 illustrate more clearly the connection of the pawl 1 to the drive chain 6. In the region directly behind the pawl 1, two chain spindles 16 are elongated and have rollers 8 mounted on them outside the line of the chain 6 itself. These rollers 8 move in and are constrained by a guide channel 9. This ensures that the pawl remains upright regardless of the force acting on it.

The insert pawl 1 and its associated drive chain 6 could be replaced by flighted timing belts, rollers or shafts to push or otherwise transport the documents.

The invention claimed is:

1. Apparatus for transporting documents in a paper handling system, comprising:

a flexible drive train comprising a plurality of chain links;

a document transport element connected to the flexible drive train for moving documents, the document transport element comprising an insert pawl extending orthogonal to the drive train and a support member; and means for constraining the flexible drive train to move along a predetermined serial path, wherein the support member extends rearwardly in the direction of travel of the drive train and has a base length extending over at least two chain links, and overlies the drive train to restrain movement of the drive train out of the predetermined serial path, wherein said means for constraining comprise at least one roller connected to the drive flexible train and constrained for uni-dimensional movement within a guide channel, and wherein the support member rests over the top of a chain of the flexible drive train and is angled to cover the width of the chain.

2. Apparatus according to claim 1, wherein the roller is mounted adjacent and parallel to the flexible drive train.

3. Apparatus for transporting documents in a paper handling system, comprising:

a flexible drive train comprising a plurality of chain links;

a document transport element connected to the flexible drive train for moving documents along a predetermined serial path, the document transport element comprising an insert pawl extending orthogonal to the drive train and a support member; and at least one roller connected to the flexible drive train and constrained for uni-dimensional movement within a guide channel, wherein the support member extends rearwardly in the direction of travel of the drive train and has a base length extending over at least two chain links, and overlies the drive train to restrain movement of the drive train out of the predetermined serial path, and wherein the support member rests over the top of a chain of the flexible drive train and is angled to cover the width of the chain.

* * * * *